Figure 1:
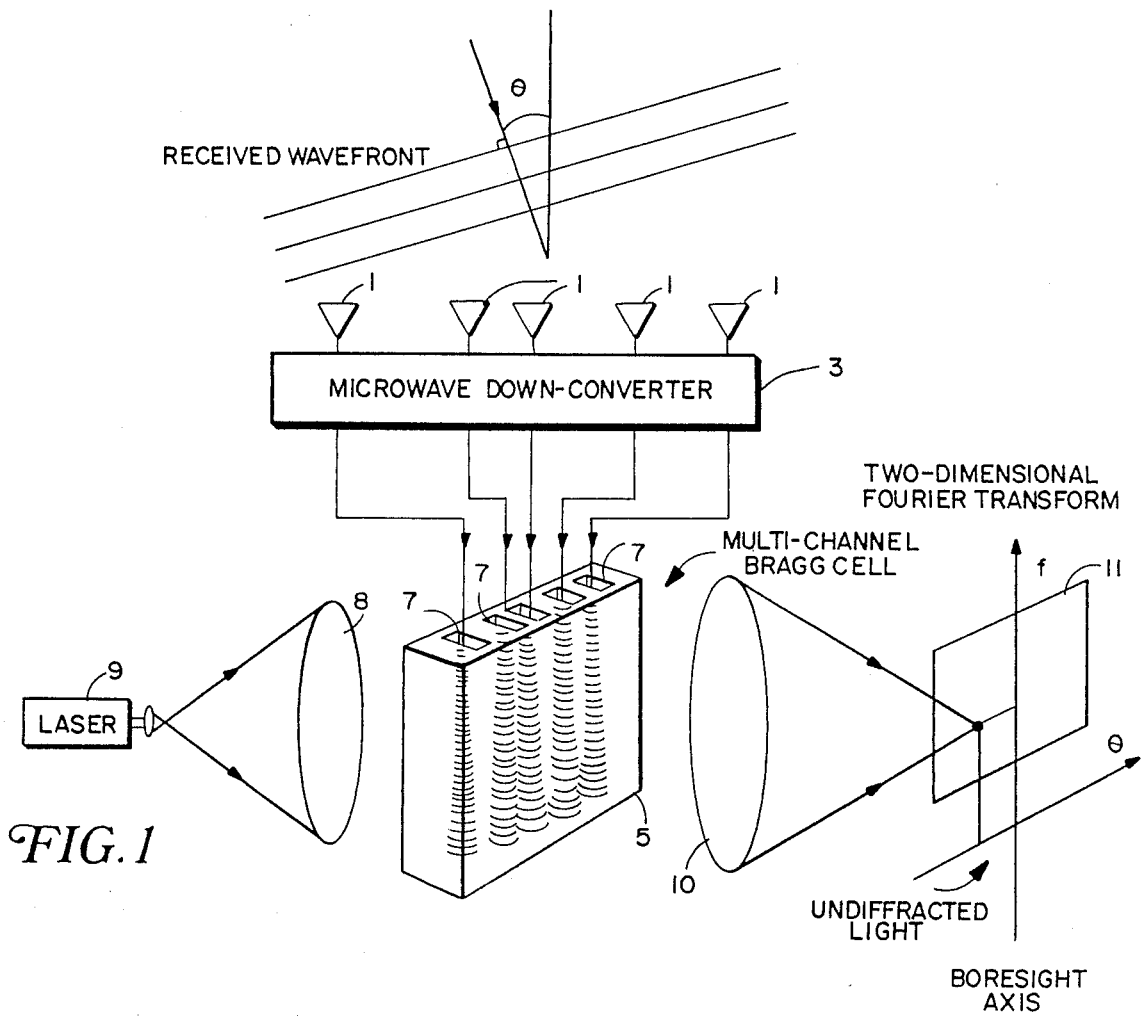

United States Patent [19]

Lee

[11] Patent Number: 4,951,061
[45] Date of Patent: Aug. 21, 1990

[54] TWO DIMENSIONAL ACOUSTO-OPTIC SIGNAL PROCESSOR USING CIRCULAR ANTENNA ARRAY AND A BUTLER MATRIX

[75] Inventor: Jim P. Lee, Nepean, Canada

[73] Assignee: Her Majesty the Queen in right of Canada, as represented by Minister of National Defence of Her Majesty's Canadian Government, Ottawa, Canada

[21] Appl. No.: 360,019

[22] Filed: Jun. 1, 1989

[30] Foreign Application Priority Data

Nov. 2, 1988 [CA] Canada .................................. 582013

[51] Int. Cl.$^5$ ................................................ G02F 1/33
[52] U.S. Cl. .................................... 342/373; 342/376; 330/4.3
[58] Field of Search ................. 342/54, 368, 369, 373, 342/376; 332/7.51; 367/100

[56] References Cited

U.S. PATENT DOCUMENTS

| | | |
|---|---|---|
| Re. 31,772 | 12/1984 | Gerst et al. |
| 3,255,450 | 6/1966 | Bulter |
| 4,634,230 | 1/1987 | Spezio |
| 4,802,149 | 1/1989 | Moore |

Primary Examiner—Thomas H. Tarcza
Assistant Examiner—Mark Hellner
Attorney, Agent, or Firm—Nixon & Vanderhye

[57] ABSTRACT

An interferometric acoustooptic signal processor utilizing a circular antenna array to cover a 360 degree field of view. Each antenna element of the array is connected to an input port of a Butler matrix. The signals are phase shifted within the Butler matrix and applied to a multi-channel periodic Bragg cell, resulting in generation of one or more acoustic waves therein. A laser beam is used to illuminate the Bragg cell and is modulated due to interaction with the acoustic waves, resulting in diffraction of the laser beam and generation of a diffracted beam pattern output from the Bragg cell. A Fourier transform lens focuses the diffracted laser beam on a back focal plane at a point characterized by two perpendicular coordinates designating the input signal power spectrum and the angle of incidence in relation to the antennae, respectively. By utilizing a circular antenna array with a Butler matrix a full 360 degree field of view is obtained using only one 2-D acoustooptic signal processor and the peak sidelobe to mainlobe level is reduced up to −30 dB. Furthermore, the accuracy and resolution of the processor are independent of frequency.

8 Claims, 4 Drawing Sheets

TWO DIMENSIONAL ACOUSTO-OPTIC SIGNAL PROCESSOR USING CIRCULAR ANTENNA ARRAY AND A BUTLER MATRIX

This invention relates in general to optical signal processing, and more particularly to acoustooptic diffraction utilizing a circular antenna array, a Butler matrix and a multi-channel Bragg cell.

An important objective in the field of radar electronic support measures is the development of wide band radar receivers for real time sorting and identification of incoming simultaneous microwave signals in terms of frequency and bearing.

One prior art approach to simultaneous signal sorting utilizes an interferometric acoustooptic signal processor employing a multi-channel Bragg cell. Such a configuration is described in an article by the present inventor J. P. Y. Lee, entitled "Interferometric Acoustooptic Signal Processor For Simultaneous Direction Finding and Spectrum Analysis", Applied Optics, Vol. 22, No. 4, pages 867–872, March 15, 1983.

According to this prior art configuration, an incoming microwave signal is received at a predetermined angle of incidence by a plurality of strategically placed antennae. The received incoming signal is applied to a multi-channel Bragg cell comprised of a plurality of transducers and a block of acoustooptic material. Each transducer is connected to a respective one of the antennae, and the transducer spacing is made proportional to the spacing of the respective antennae. The received signal is applied via the transducers to the block of acoustooptic material, resulting in an acoustic field or wave pattern being generated therein.

A laser beam is used to illuminate the acoustooptic block, and is diffracted due to interaction with the acoustic field generated therein. The diffracted laser beam is then focussed via a Fourier transform lens onto a back focal plane at a predetermined point, defined by Cartesian coordinates in relation to a point of origin on the back focal plane designative of an undiffracted beam. The intensity distribution of the Fourier transform represents the power spectrum of the signal on one axis, and the angle of incidence on the other axis.

This prior art approach has been found to be very useful for microwave signal sorting wherein the incoming signals are spatially separated in frequency and direction of arrival (i.e. angle of incidence). The direction of arrival and frequency resolutions are obtained by combining the inherently high angular resolution of an interferometer with the frequency spectral analysis capability of a Bragg cell receiver.

According to the aforementioned article of J. P. Y. Lee, it was concluded that an aperiodic array with four or five transducers constituted the optimum configuration for a broadband two-dimensional acoustooptic receiver. This conclusion was based on factors such as complexity, cost, required main lobe beamwidth, side lobe level and antenna size.

However, for this optimum configuration it was found that the inter-transducer spacing was required to be much larger than the space occupied by the acoustic transducers themselves. Thus, in the event that the prior art multi-channel Bragg cell is uniformly illuminated by the laser beam, a large portion of the incident light does not interact with the acoustic waves within the cell, even though there may be an appreciable spread in the acoustic wave profile. This has been found to reduce the amount of light diffracted within the Bragg cell, resulting in a corresponding drop in sensitivity of the receiver.

One prior art solution to this problem has been to use holographic lenses to split the input laser beam into a number of coherent beams for illuminating the acoustic waves. However, in addition to the complexity in fabricating and handling of the holographic lenses, these components have been found to introduce distortion and signal losses to the receiver.

Another prior art solution to the problem of large inter-transducer spacings is proposed by J. P. Y. Lee in copending Canadian Patent Application Ser. No. 561,917, filed March 18, 1988 and entitled MODIFIED MULTI-CHANNEL BRAGG CELL USING A PHASED ARRAY STRUCTURE FOR THE IMPROVEMENT OF OVERALL EFFICIENCY, in which a plurality of sets of transducers are arranged in a phased array for receiving microwave signals from respective ones of a plurality of antennas. An advantage of this prior art system is that a large portion of the incident laser power is utilized constructively to increase the total amount of light diffracted, thereby improving signal reception and processing effeciency.

A disadvantage of the linear antenna array structure used in the above-described prior art systems is that the useful angular coverage of the receiver is typically restricted to only one quadrant (i.e. 90° sector), such that in order to cover a full 360° field of view, four identical receivers are required.

In addition, when using an optimum linear aperiodic array with only four to five antenna elements to cover an octave or more in frequency, the sidelobe to main-lobe levels of the projected 2-D pattern are usually high, typically $-2$ to $-3$ dB for an angular accuracy in the order of one degree.

Furthermore, when using a linear antenna array to cover a broad frequency band, the baseline length of the antenna array, when expressed in terms of the number of wavelengths, changes with frequency. As a result, the bearing information obtained in the back focal plane by measuring the peak position of the direction of arrival pattern must be scaled by a factor which is proportional to the frequency of the signal. Also, the direction of arrival (i.e. bearing) accuracy and resolution must be scaled by the same scaling factor.

In order to overcome the disadvantages of the prior art systems discussed above, the receiver of the present invention utilizes a circular array to cover the entire 360° field of view. Each antenna element of the array is connected to an input port of a Butler matrix. The signals are phase shifted within the Butler matrix and applied to a multi-channel periodic Bragg cell, resulting in generation of one or more acoustic waves therein. A laser beam is used to illuminate the Bragg cell and is modulated due to interaction with the acoustic waves, resulting in diffraction of the laser beam and generation of a diffracted beam pattern output from the Bragg cell. A Fourier transform lens focuses the diffracted laser beam on a back focal plane at a point characterized by two perpendicular coordinates designating the input signal power spectrum and the angle of incidence in relation to the antennae, respectively.

By utilizing a circular antenna array with a Butler matrix a full 360° field of view is obtained with only a single 2-D processor, as opposed to the four or more processors which are required when using a linear antenna array.

Also, the peak sidelobe to mainlobe level is reduced from −2 dB to −30 dB over the prior art system, for a bearing accuracy in the order of one degree.

Furthermore, according to the present invention, the shift in the direction of arrival pattern as a function of input azimuthal angle is independent of frequency with the result that both the accuracy and resolution of the instant processor are also independent of frequency.

Moreover, since the transducers of the multi-channel Bragg cell of the present invention are in a periodic arrangement, the inter-transducer spacing can be reduced considerably as compared to the prior art aperiodic arrangement. Thus, according to the present invention the acoustic columns can be illuminated uniformly without the use of holographic lenses.

In addition, if the ratio of the transducer width to inter-transducer spacing is assumed to be 1:3, then for a Gaussian illumination profile truncated at the 1/exp(3.125) points the maximum through-put loss of the present system is 5 dB as compared to 12 dB for a typical 4-element aperiodic array.

Thus, in general, according to the present invention there is provided a two-dimensional acousto-optic receiver for detecting the power spectrum and bearing angle of an incoming signal, comprised of a circular antenna array having a plurality of input antenna elements equispaced in the azimuth plane for receiving the incoming signal. A feed network is provided having a plurality of input ports connected to respective ones of the antenna elements, for receiving the signal from respective ones of said antenna elements and in response generating a plurality of phase shifted versions of the received signal on successive output ports of the network, successive ones of the phase shifted versions of the signal being characterized by a phase difference which is proportional to the bearing angle. A multi-channel Bragg cell is provided comprised of a plurality of transducers connected to respective ones of the output ports and mounted on a block of acoustooptic material, for receiving the phase shifted versions of the signal from the feed network and applying the phase shifted versions to the block of acoustooptic material such that an acoustic field is created therein. A laser is included for generating a beam of monochromatic collimated light on the block, wherein the beam is diffracted within the block due to optical interaction with the acoustic field. A Fourier transform lens is also provided for receiving and focussing the diffracted beam at one or more predetermined points on a two-dimensional plane, each of the points being characterized by first and second coordinates in relation to a point of origin designative of an undiffracted beam, wherein the first coordinates are proportional to the power spectrum and the second coordinates are proportional to the bearing angle.

According to the present invention there is also provided a method of detecting the power spectrums and bearing angles of one or more incoming signals, comprising the steps of receiving the incoming signals via a plurality of input antenna elements equispaced in the azimuth plane; applying the signals received via the plurality of antenna elements to a feed network for phase shifting the signals and in response generating a plurality of phase shifted versions of the signals, characterized by respective phase differences which are proportional to respective ones of the bearing angles. The phase shifted versions of the signals are then applied to a multi-channel Bragg cell, for creating an acoustic field within the Bragg cell. A beam of monochromatic collimated light is generated and applied to the block, the beam being diffracted within the block due to optical interaction with the acoustic field; and the diffracted beam is then focused at one or more predetermined points on a two-dimensional plane, each of the points being characterized by first and second coordinates in relation to a point of origin designative of an undiffracted beam, the first coordinates being proportional to the respective power spectrums and the second coordinates being proportional to the respective bearing angles.

Figure 2:
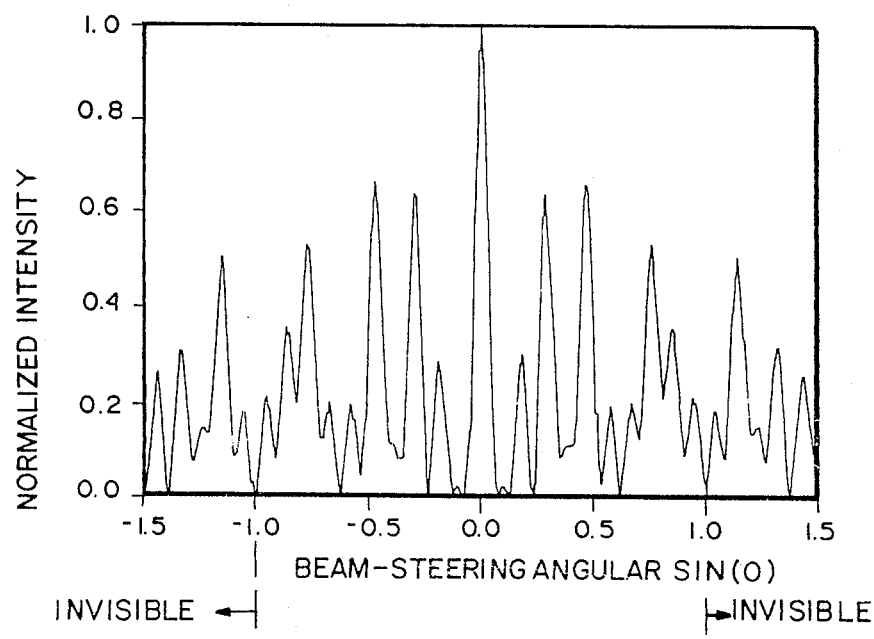
Figure 3:
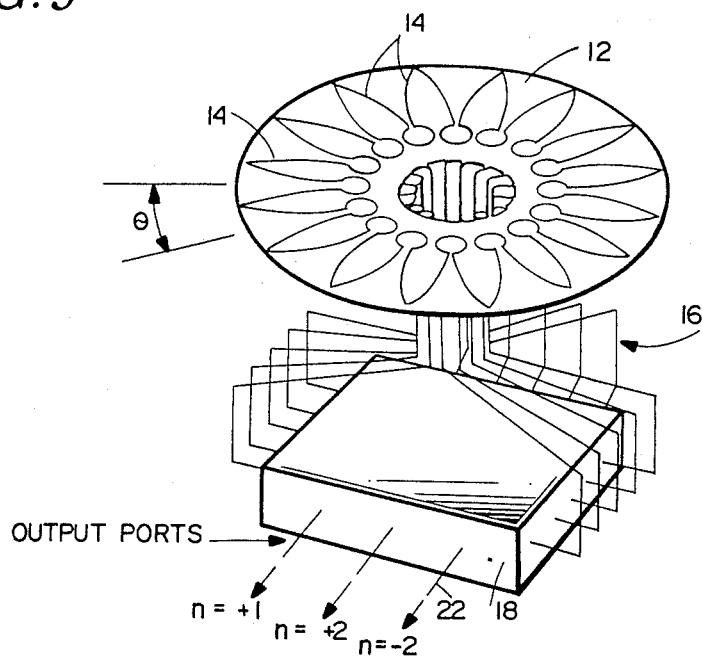
Figure 4:
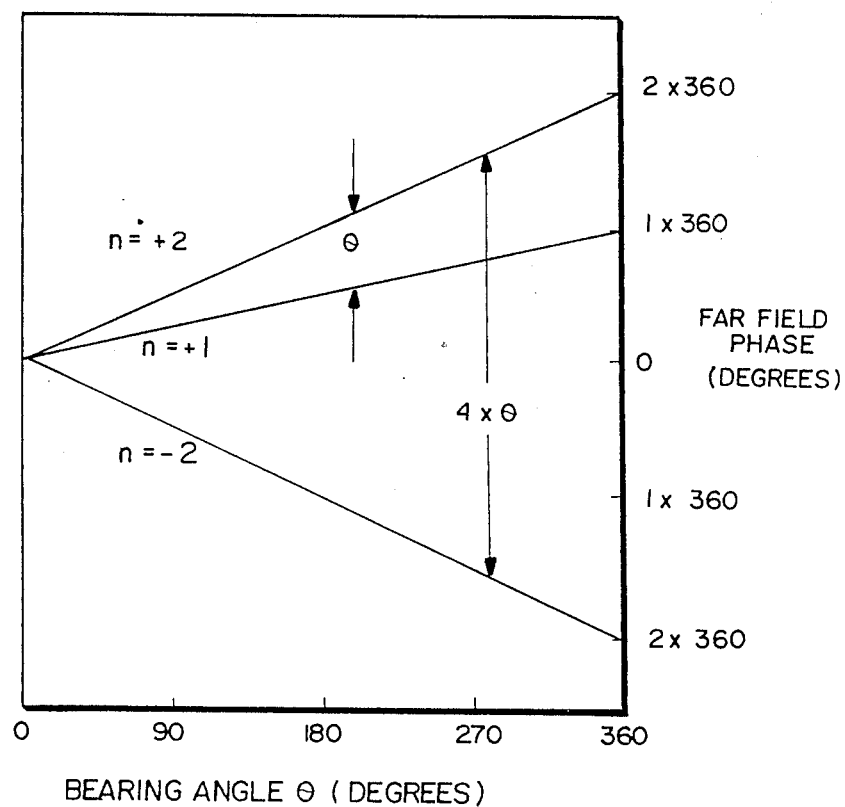
Figure 5:
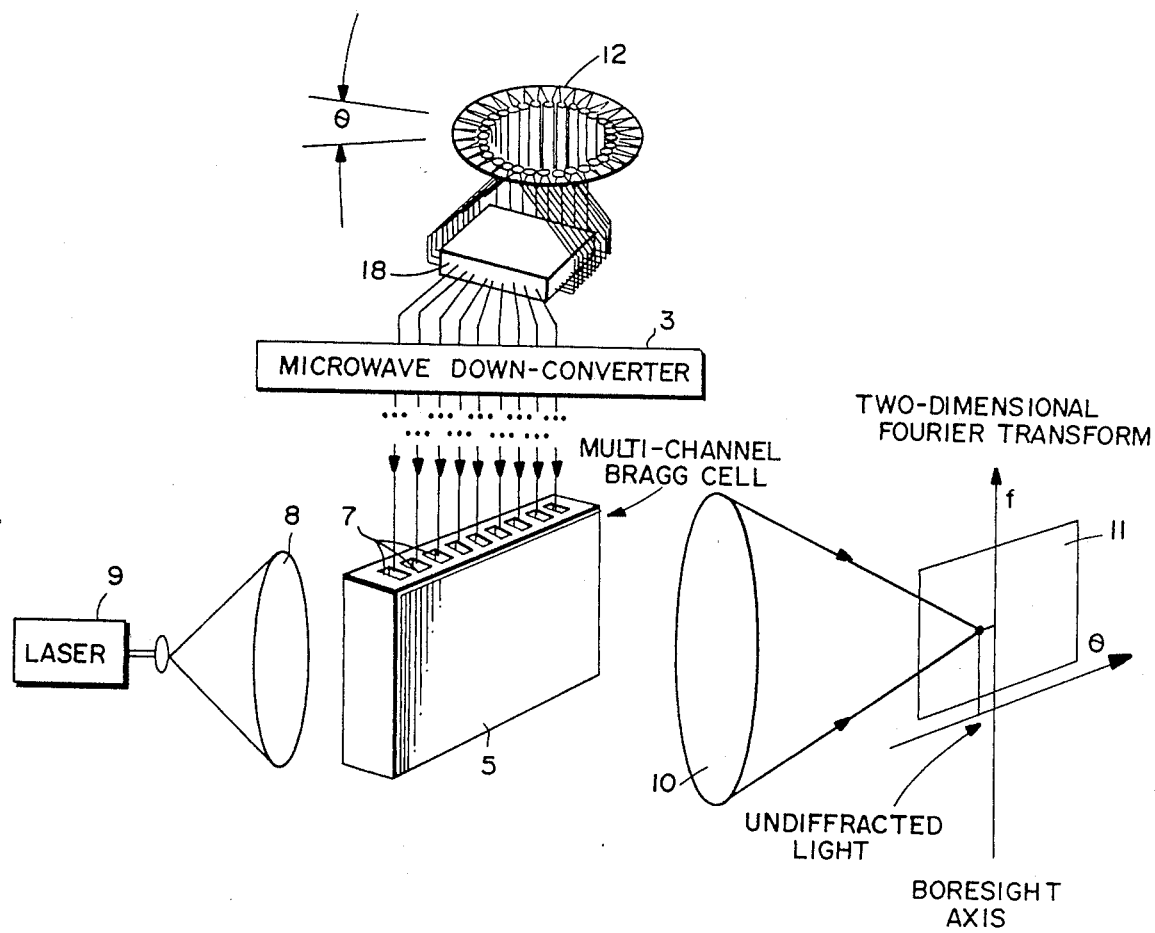
Figure 6:
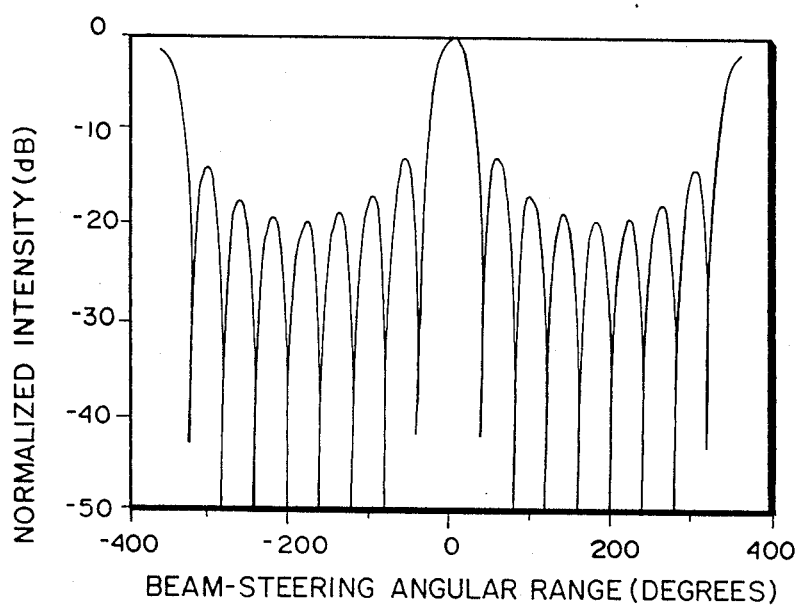
Figure 7:
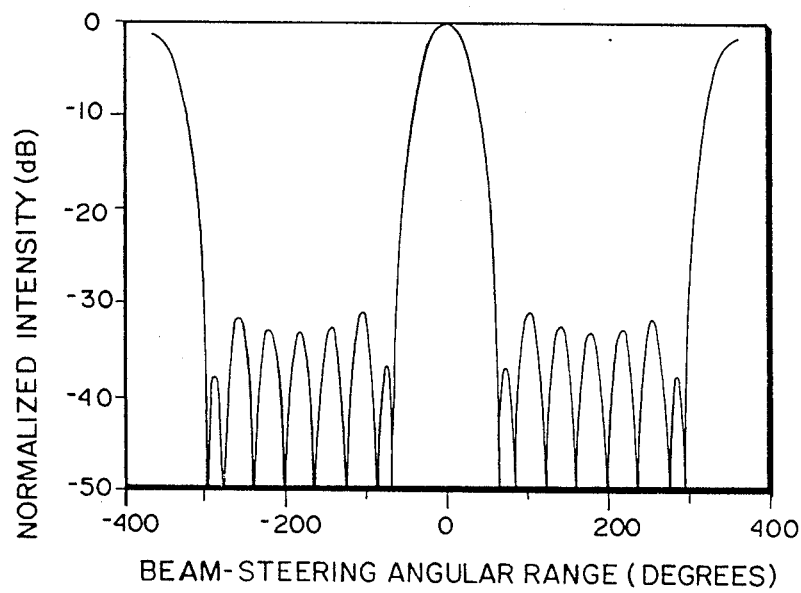

A better understanding of the present invention will be obtained with reference to the detailed description below in conjunction with the following drawings in which:

FIG. 1 is a block schematic diagram of an interferometric acoustooptic signal processor according to the prior art, FIG. 2 is a graph of the normalized direction of arrival pattern for a typical 4-element linear array, according to the prior art, FIG. 3 is a right-front perspective view of a circular antenna array and feed network used in conjunction with the present invention, FIG. 4 is a graph of the far field phase versus bearing angle for a signal received and processed by the circular anrtenna array and feed network of FIG. 3, FIG. 5 is a block schematic diagram of a two-dimensional acoustooptic receiver using a circular antenna array and feed network, in accordance with the present invention, FIG. 6 is a graph of the direction of arrival pattern for the receiver of FIG. 5 with a signal received on boresight and a rectangular laser illumination profile, and FIG. 7 is a graph of the direction of arrival pattern for the receiver of FIG. 5 with a signal received on boresight and a truncated Gaussian illumination profile at the 1/exp(3.125) points.

With reference to FIG. 1, the prior art interferometric acoustooptic signal processor discussed in the prior art publication of J. P. Y. Lee, is illustrated. The signal processor is comprised of a plurality of antennae shown generally as 1, for receiving an incoming microwave characterized by an angle of $\theta$ with respect to the antenna 1, and a microwave down converter 3 connected to the antenna 1 for converting the received microwave signal to a plurality of intermediate frequency (IF) signals which are then applied to a multi-channel Bragg cell 5 via a plurality of transducers 7. The ratio of the acoustic transducer spacings are made the same as the spacings between the microwave antennae 1.

Application of the incoming signals to the Bragg cell 5 results in generation of a plurality of acoustic waves therein.

A laser 9 generates a beam of monochromatic light which is expanded and collimated via a beam collimator 8 onto an object plane surface of the Bragg cell 5. As a result of the acoustooptic interaction between the laser beam and the acoustic waves within the Bragg cell, a diffracted light beam is generated within the Bragg cell 5, output therefrom and focused via a Fourier transform lens 10 onto a back focal plane 11.

The intensity distribution of the Fourier transformed beam is proportional to the power spectrum of the received microwave signal, and is characterized by the f-coordinate on the back focal plane 11. Similarly, the direction of arrival of the microwave signal is characterized by the $\theta$-coordinate on back focal plane 11.

FIG. 2 illustrates a normalized intensity pattern for a typical 4-element optimum array using the prior art system of FIG. 1, with a total antenna array baseline length of 10.5 at 12.5 GHz and element locations at 0, 3.71, 6.23, and 10.5, where designates the microwave signal wavelength. The height of the acoustic transducer is L/60, where L is the total baseline length of the acoustic array.

As can be seen from FIG. 2, the sidelobe to mainlobe levels are approximately $-2$ to $-3$ db for an angular accuracy of the order of one degree.

Turning to FIG. 3, a typical circular antenna array 12 is shown comprised of a plurality of antenna elements 14 arranged in a circle to cover a full 360° field of view. Each antenna element 14 is connected to a respective input port 16 of a feed network 18, such as a Butler matrix.

The Butler matrix is essentially a phase shifting network containing 180° hybrids, 90° hybrids and phase shifters, and is provided with a plurality (N) of input ports 16 and output ports 22, where N is usually a power of 2, and wherein all of the input ports 16 are isolated from one another.

In operation, a signal applied at any one of the output ports 22 results in equal amplitude signals appearing on respective ones of the input ports 16 (and hence also on the antenna elements 14), but with the relative phase of each signal varying linearly across the array 12.

More particularly, a signal applied to a predetermined output port n results in modes being generated at successive ones of the antenna elements 14 with an exp(jn) phase progression, where is the bearing angle and n is the mode number related to each output port 22. For N antenna elements the following modes are possible: $n = 0, \pm 1, \pm 2, \pm 3, \ldots, \pm(N/2-1), \pm N/2$.

A complete description of operation of the circular antenna array and feed network can be found in an article by B. Scheleg entitled "A Matrix-Fed Circular Array for Continuous Scanning", Proc. IEEE Vol. 56, No. 11, pp. 2016–2027, November 1968.

In accordance with the present invention, not all of the Butler matrix output ports 22 are used, and the purpose is not to form a narrow beam in the azimuth plane, but to get omnidirectional coverage. In the far field of the array 12 the pattern is omnidirectional in azimuth for all modes.

Thus, in general, the ideal phase variation versus bearing angle for mode n is equal to $n\theta$.

The ideal phase variation versus bearing angle is shown with reference to FIG. 4 for modes $n = +1, +2$ and $-2$. When a signal is received at an azimuthal angle $\theta$, from reciprocity the received phase at the $n = +1$, $+2$ and $-2$ output ports 22 of the feed network 18 will have the identical phase relationship in the far field. Hence, a phase comparison of the $n = +2$ and $n = +1$ output ports is a direct measurement of the bearing angle. An important feature of the present system is that the measured phase is equal to the bearing angle independent of frequency.

Combined circular arrays and feed networks have been used in the past for receiving microwave signals. However, in such systems the signals received from the feed network are typically processed two channels at a time by a bank of phase comparators for performing phase comparison between the signals received from feed network. A typical bearing accuracy for such prior art systems is 2° RMS.

A discussion of the prior art systems can be found with reference to the following publications: "Digital ESM Receivers with High D/F Accuracy", Anaren Microwave, Pub. M1826-18, and "2-18 GHz. Digital ESM Receivers with 2° RMS Bearing Accuracy", Anaren Microwave, Pub. M1830-28.

Turning to FIG. 5, a schematic block diagram of the present invention is shown wherein the combined circular antenna array 12 and feed network 18 are connected to an acoustooptic processor similar to that shown in FIG. 1. Microwave signals received by the antenna array 12 and phase shifted via the feed network 18 are first down-converted by a down-converter 3 to a lower intermediate frequency, and then applied to the transducers 7 of a multi-channel acoustooptic signal processor. Since the phase variation from port n equals n, a periodic multi-channel Bragg cell structure is utilized.

Thus, a typical 32-element circular array 12 is shown in conjunction with a Butler matrix 18 having nine output ports: $n = 0, \pm 1, \pm 2, \pm 3, \pm 4$. The intensity distributions of the direction of arrival far field intensity patterns in the Fourier plane, are shown in FIGS. 6 and 7, for a signal received on boresight. Additionally, FIG. 7 shows the effect of Gaussian amplitude weighting in the illumination optics on the direction of arrival pattern.

In the event that an incoming signal is received off boresight, the direction of arrival pattern shown in FIGS. 6 and 7 shifts in position, and the location of the peak pattern gives a direct measure of the bearing angle independent of frequency.

As discussed above, prior art microwave receivers using circular antenna arrays and Butler matrix feed networks were characterized by a typical bearing detection accuracy of 2° RMS. According to a successful prototype of the present invention, an improvement factor of 1.37 was observed in the bearing accuracy over such prior art systems when the phase error in each port is the same. In other words, a bearing accuracy of 1.5° RMS has been achieved by the receiver of the present invention.

In summary, by using a circular antenna array with a Butler matrix in combination with a multi-channel Bragg cell with periodic arrangement of the transducers, significant improvements are realized over the prior art. In all other respects the system of the present invention operates in an identical manner to the prior art system of FIG. 1.

A comparison of the direction of arrival patterns shown in FIG. 2 for the prior art and FIG. 7 for the present invention reveal a number of improvements. Firstly, as discussed above, a full 360° field of view is provided by the system of the present invention when using a single 2-D acoustooptic signal processor, whereas the prior art provides only 90° field of view. The peak sidelobe to mainlobe level is reduced from $-2$ dB to $-30$ dB for a bearing accuracy of the order of one degree. The shift in direction of arrival pattern as a function of input azimuthal angle is indepedent of frequency and, as a result, both the accuracy and resolution of the receiver of the present invention are also independent of frequency. Also, since the transducers of the multi-channel Bragg cell are disposed in a periodic arrangement, the inter-transducer spacings can be reduced considerably as compared to the aperiodic arrangement of FIG. 1. Thus, the acoustic waves can be illuminated in accordance with the present invention without the use of holographic lenses.

A person understanding the present invention may conceive of other embodiments or variations therein.

For example, as discussed above, the received high frequency microwave signals may be down-converted to intermediate frequency (IF) signals prior to being applied to the Bragg cell, in a well known manner. Also, it is contemplated that the Bragg cell structure may be modified to include a plurality of sets of transducers arranged in a phased array, with each set being identical to the others, or different sets of arrays arranged with different numbers of transducers excited according to different phases of the input signals.

All such embodiments or variations are believed to be within the sphere and scope of the present invention as defined in the claims appended hereto.

What is claimed:

1. A two-dimensional acoustooptic receiver for detecting the power spectrum and bearing angle of an incoming signal, comprising:
   (a) a circular antenna array having a plurality of input antenna elements equispaced in the azimuth plane for receiving said incoming signal;
   (b) a feed network having a plurality of input ports connected to respective ones of said antenna elements, for receiving said signal from respective ones of said antenna elements and in response generating a plurality of phase shifted versions of said signal on successive output ports of said network, successive ones of said phase shifted versions of said signal being characterized by a phase difference which is proportional to said bearing angle;
   (c) a multi-channel Bragg cell receiver comprised of a plurality of transducers connected to respective ones of said output ports and mounted on a block of acoustooptic material, for receiving said phase shifted versions of said signal from said feed network and applying said phase shifted versions to said block of acoustooptic material such that an acoustic field is created therein, said transducers being arranged with a ratio of transducer width to inter-transducer spacing of 1:3;
   (d) a laser for generating a beam of monochromatic collimated light on said block, said beam being diffracted within said block due to optical interaction with said acoustic field, said beam being modified to provide a Gaussian illumination profile truncated at the 1/exp(3.125) points, resulting in a maximum through-put loss of 5 dB for said receiver; and
   (e) a Fourier transform lens for receiving and focusing said diffracted beam at one or more predetermined points on a two-dimensional plane, each of said points being characterized by first and second coordinates in relation to a point of origin designative of an undiffracted beam, said first coordinates being proportional to said power spectrum and said second coordinates being proportional to said bearing angle.

2. An acoustooptic receiver as defined in claim 1, wherein said feed network is comprised of a Butler matrix having N input ports and N output ports characterized by a plurality of modes (n), as follows: n=0, ±0 1, ±2,±3, . . . , ±(N/2−1), ±N/2, and wherein said phase difference is given by nθ, where θ designates said bearing angle.

3. An acoustooptic receiver as defined in claim 2, wherein said Bragg cell includes a periodic arrangement of said transducers.

4. An acoustooptic receiver as defined in claim 1, further comprised of a down-converter connected between said output ports of the feed network and said transducers, for down-converting the frequency of said received signal to an intermediate frequency.

5. An acoustooptic receiver as defined in claim 1, wherein said antenna array is comprised of 32 of said elements, said feed network is comprised of 32 input ports and nine output ports, and said Bragg cell is comprised of a multi-channel arrangement of periodic transducers.

6. An acoustooptic receiver as defined in claim 1, wherein said feed network is further comprised of one or more 180° and 90° hybrids and phase shifters.

7. A method for detecting the power spectrums and bearing angles of one or more incoming signals, comprising the steps of:
   (a) receiving said incoming signals via a plurality of input antenna elements equispaced in the azimuth plane;
   (b) applying said signals received via said plurality of antenna elements to a feed network for phase shifting said signals and in response generating a plurality of phase shifted versions of said signals, said phase shifted versions being characterized by respective phase differences which are proportional to respective ones of said bearing angles;
   (c) applying said phase shifted versions to a multi-channel Bragg cell, for creating an acoustic field within said Bragg cell, said Bragg cell receiver comprising a plurality of transducers connected to respective ones of output ports of said feed network and mounted on a block of acoustooptic material for receiving said phase shifted versions of said signal from said feed network and applying said phase shifted versions to said block of acoustooptic material such that an acoustic field is created therein, said transducers being arranged with a ratio of transducer width to inter-transducer spacing of 1:3;
   (d) generating and applying a beam of monochromatic collimated light to said block, said beam being diffracted within said block due to optical interaction with said acoustic field, said beam being modified to provide a Gaussian illumination profile truncated at the 1/exp(3.125) points, resulting in a maximum through-put loss of 5 dB for said receiver; and
   (e) focusing said diffracted beam at one or more predetermined points on a two-dimensional plane, each of said points being characterized by first and second coordinates in relation to a point of origin designative of an undiffracted beam, said first coordinates being proportional to said respective power spectrums and said second coordinates being proportional to said respective bearing angles.

8. In a two-dimensional acoustooptic receiver comprised of a multi-channel Bragg cell for diffracting an incident laser beam by means of optical interaction with one or more acoustic fields created therewithin, the improvement comprising:
   (a) a circular antenna array having a plurality of input antenna elements equispaced in the azimuth plane for receiving one or more incoming signals; and (b) a feed network having plurality of input ports connected to respective ones of said antenna elements, for receiving said signals from respective ones of said antenna elements and in response generating a plurality of phase shifted versions of said signals on successive output ports of said network, and applying said phase shifted versions of said signals to said Bragg cell, thereby creating said one or more acoustic fields, said Bragg cell comprising a plurality of transducers connected to respective ones of output ports of said network and mounted on a block of acoustooptic material, for receiving said phase shifted versions of said signal from said feed network and applying said phase shifted versions to said block of acoustooptic material such that an acoustic field is created therein, said transducers being arranged with a ratio of transducer width to inter-transducer spacing of 1:3, said laser beam being modified to provide a Gaussian illumination profile truncated at the 1/exp(3.125) points, resulting in a maximum through-put loss of 5 dB for said receiver, whereby successive ones of said phase shifted versions of said signals are characterized by a phase difference which is proportional to said bearing angle.

* * * * *